United States Patent
Maier (10) Patent No.: US 9,732,941 B2
(45) Date of Patent: Aug. 15, 2017

(54) DIFFUSE LIGHT SOURCE AND VISUAL DAZZLER SYSTEM MADE THEREFROM

(71) Applicant: Nathan Christopher Maier, Hayward, CA (US)

(72) Inventor: Nathan Christopher Maier, Hayward, CA (US)

(73) Assignee: LIGHTHOUSE TECH PTE. LTD., Singapore (SG)

( * ) Notice: Subject to any disclaimer, the term of this patent is extended or adjusted under 35 U.S.C. 154(b) by 0 days.

(21) Appl. No.: 14/774,879

(22) PCT Filed: Mar. 11, 2014

(86) PCT No.: PCT/US2014/023731
§ 371 (c)(1),
(2) Date: Sep. 11, 2015

(87) PCT Pub. No.: WO2014/164898
PCT Pub. Date: Oct. 9, 2014

(65) Prior Publication Data
US 2016/0025305 A1    Jan. 28, 2016

Related U.S. Application Data

(60) Provisional application No. 61/775,685, filed on Mar. 11, 2013, provisional application No. 61/755,994, filed on Mar. 11, 2013.

(51) Int. Cl.
*F21L 4/04* (2006.01)
*F21V 13/04* (2006.01)
(Continued)

(52) U.S. Cl.
CPC ............... *F21V 13/04* (2013.01); *F21K 9/65* (2016.08); *F21L 4/00* (2013.01); *F21V 5/04* (2013.01);
(Continued)

(58) Field of Classification Search
CPC . F21V 13/04; F21V 5/04; F21V 29/70; F21K 9/65; F21L 4/00; F41H 13/005;
(Continued)

(56) References Cited

U.S. PATENT DOCUMENTS

| 4,694,381 A | 9/1987 | Dedoro | |
| 5,222,798 A * | 6/1993 | Adams | F21L 11/00 102/355 |

(Continued)

FOREIGN PATENT DOCUMENTS

WO    2013/166417 A1    11/2013

OTHER PUBLICATIONS

Printout: Carclo Technical Plastics, "Uniform Hemi-Spherical Emitter Bubble Optic", 2006, 1 page.
(Continued)

*Primary Examiner* — Alexander Garlen
(74) *Attorney, Agent, or Firm* — Thomas Schneck (57) ABSTRACT

A diffuse light source, for use in energy efficient lighting, as well as for visual disorientation or disruption systems, is configured with a single solid torus (15) or rotating dual cylinder (35*a*, 35*b*) diffuser of transparent refracting material into which light (13, 33) from a laser or LED beam source (11, 31) is coupled. Light (19, 39) emerges radially outward in all directions from the diffuser.

13 Claims, 6 Drawing Sheets

(51) Int. Cl.

| | | |
|---|---|---|
| *G02B 19/00* | (2006.01) | |
| *F41H 13/00* | (2006.01) | |
| *F21V 29/70* | (2015.01) | |
| *F21L 4/00* | (2006.01) | |
| *F21V 5/04* | (2006.01) | |
| *F21K 9/65* | (2016.01) | |
| *F21W 131/40* | (2006.01) | |
| *F21Y 115/30* | (2016.01) | |
| *F21Y 115/10* | (2016.01) | |

(52) U.S. Cl.
CPC ............ *F21V 29/70* (2015.01); *F41H 13/00* (2013.01); *F41H 13/0087* (2013.01); *G02B 19/0028* (2013.01); *G02B 19/0061* (2013.01); *F21W 2131/40* (2013.01); *F21Y 2115/10* (2016.08); *F21Y 2115/30* (2016.08)

(58) Field of Classification Search
CPC ............ F41H 13/0056; F41H 13/0087; F21Y 2101/00; F21Y 2115/30; F21W 2131/40; G02B 19/0028; G02B 19/0061
See application file for complete search history.

(56) References Cited

U.S. PATENT DOCUMENTS

| | | | |
|---|---|---|---|
| 6,496,272 B1 | 12/2002 | Watanabe | |
| 6,575,597 B1 * | 6/2003 | Cramer | F21L 11/00 116/22 A |
| 6,799,868 B2 | 10/2004 | Brown et al. | |
| 7,083,297 B2 | 8/2006 | Matthews et al. | |
| 7,164,536 B2 | 1/2007 | Whitehead | |
| 7,416,322 B2 | 8/2008 | Tanaka et al. | |
| 8,051,761 B1 * | 11/2011 | Ullman | F41H 3/00 359/196.1 |
| 8,139,909 B2 | 3/2012 | Alasaarela et al. | |
| 8,270,078 B2 | 9/2012 | Meyers et al. | |
| 8,402,665 B2 | 3/2013 | Litvin et al. | |
| 8,408,745 B2 | 4/2013 | Cameron et al. | |
| 8,414,151 B2 | 4/2013 | Allen et al. | |
| 8,419,213 B1 * | 4/2013 | Rubtsov | F41H 13/0087 340/573.1 |
| 8,636,384 B2 | 1/2014 | Battis et al. | |
| 2002/0172041 A1 | 11/2002 | Brown et al. | |
| 2005/0024744 A1 | 2/2005 | Falicoff et al. | |
| 2005/0122711 A1 | 6/2005 | Matthews et al. | |
| 2006/0119483 A1 * | 6/2006 | Rubtsov | F41H 13/0087 340/574 |
| 2006/0233215 A1 * | 10/2006 | Casazza | F41H 13/0056 372/70 |
| 2007/0145915 A1 | 6/2007 | Roberge et al. | |
| 2007/0274353 A1 | 11/2007 | Hauck et al. | |
| 2008/0216699 A1 | 9/2008 | McAleer et al. | |
| 2010/0123397 A1 | 5/2010 | Tian et al. | |
| 2011/0080740 A1 | 4/2011 | Allen et al. | |
| 2011/0080742 A1 | 4/2011 | Allen et al. | |
| 2011/0116257 A1 * | 5/2011 | Eisenberg | F41H 13/0087 362/109 |
| 2011/0216542 A1 | 9/2011 | Di Trapani et al. | |
| 2012/0075843 A1 * | 3/2012 | Battis | F41A 33/02 362/157 |

OTHER PUBLICATIONS

Printout: Fraen, "F360L-3-RE-0S Side-Emitter Lens for Luxeon Rebel and Rebel ES LEDs", Distributors by Future Electronics, 9 pages.

Printout: Defence R&D Canada, Tech. Memorandum, "Non-Lethal Weapons", No. DRDC-TM-2004-006, Dec. 2004, 165 pages.

* cited by examiner

DIFFUSE LIGHT SOURCE AND VISUAL DAZZLER SYSTEM MADE THEREFROM

TECHNICAL FIELD

The present invention relates generally to optical systems for illumination and more particularly to laser or LED-based lighting systems and light dispersion systems combining a light source with a light modifier for delivery of light dispersed over a wide distribution with angular range greater than 75 degrees. Especially pertinent are those systems where the light modifier is a transparent refractive diffuser element providing multiple partial internal reflections. Potential applications include not only energy efficient lighting, but also visual "dazzler" systems for the temporary loss of sight and disorientation of a subject or target sensors in line of sight of such systems.

BACKGROUND ART

Due to increasing awareness of environmental concerns of energy usage of light sources, it is becoming more and more significant to develop more efficient and environmentally friendly light sources for homes, offices, etc. The standard incandescent bulb has become increasing suspect as an efficient light source, while compact fluorescent lamps (CFLs) contain mercury and as a result are not Restriction of Hazardous Substances (RoHS) compliant.

Currently, many researchers are looking to light emitting diodes (LEDs) as the light source of choice, because LEDs are nearly twice as efficient and last 10 times as long as CFLs but contain no mercury. LED base designs are facilitating greater light output with less heat output and lower power consumption. However, the directional nature of LED emission coupled with current lens design has made it problematic to deliver adequate usable light from LEDs for general light purposes. Some manufacturers have resorted to LED arrays contained in a sphere, while others have implemented "fly-eye"-style lens arrays, to create adequate light dispersion. However, a simple single lens would be ideal from a manufacturing cost perspective, provided a design could be found that would adequately disperse the light from a single high-output LED.

Turning to another application, situations often arise when it is desirable for law enforcement or military personnel to stun or disorient subjects for a brief period of time to avoid escalation to extreme or deadly force. Situations also arise where civilians may need to defend themselves against a would-be assailant. Various nonlethal devices exist for such purposes, including tazers, stun guns, stun grenades (flash bangs) and pepper sprays. However, most devices of this type require a level of proximity that can be undesirable, especially for non-professionals. And while pepper sprays can project their active ingredients some distance through the air, there is still potential for dispersion also to the individual deploying the spray. Devices such as stun grenades provide a momentary burst of light and sound to disorient assailants, but this device is only effective instantaneously and is not accessible to the general public.

Currently, some law enforcement and military forces are employing laser dazzlers to direct a narrow or widely focused beam of light in order to temporarily blind or visually disorient individuals when escalated force is unnecessary. These dazzler devices provide visual interruption at significant distances and thereby can avoid proximity effects on the individual employing the device. However, these devices must be aimed at the target to achieve the desired effect; and having the luxury of time (and mental fortitude) to aim a weapon while being assailed is beyond the capacity of most non-professionals.

The ideal device for such situations as these would remove the need for proximity (as the laser dazzlers provide), would mitigate proximity effects (as stun guns provide), would remove the need to aim the device (as stun grenades provide), and would provide a significant time duration of effect (such as the laser dazzler provides in comparison with a stun grenade).

SUMMARY DISCLOSURE

A diffuse light source is provided for general lighting, and in one embodiment as a visual dazzler system for temporarily disorienting subjects to light projected from that dazzler system. The diffuse light source combines a light beam source, such as a laser or LED, with a diffuser element in the form of a solid ring torus of transparent refractive material. Alternatively, the diffuser could be in the form of a pair of side-by-side cylinders, which can be rotated. The diffuser element projects light radially outward over a distribution angle of at least 75° (and usually more than this, e.g. up to 300°).

The torus diffuser element or "lens" is characterized by a surface of revolution generated from rotation of a closed plane curve (e.g., a circle) about an axis coplanar with, outside of, and proximate to the curve. The inner diameter of the torus is very small (e.g., at most 250 μm) and is generally much smaller than the beam width. The torus can be provided with a reflective coating on specified portions of its surface, such as on a rear surface located beyond the extent of the incident beam.

The beam source is positioned relative to the torus such that a light beam from the source is directed substantially along the axis of the torus. However, the beam's displacement from the axis of torus may be up to 15% of the beam width, and its incident direction can be up to 10° from the axis of the torus. The beam has a width so as to be coupled into the torus, partially reflected and partially refracted therein at the torus surface, and emitted therefrom over a wide distribution. Whether a laser or LED, the beam source may provide either a continuous or pulsed output. Because of the small opening at the center of the torus, a transparent bead may be axially positioned to intercept and refract any portion of the beam passing straight through the inner opening of the ring torus. The bead can be directly adhered to the torus, or can have a set of tiny legs projecting rearward therefrom and in contact with the torus such that the bead is forwardly offset from the torus.

The beam source and torus can be firmly mounted to a base. For that purpose, the torus can have a set of legs projecting rearward from a radially outer portion of the torus surface. The base may include heat sink material, with the light beam source and legs of the torus being partially embedded within that heat sink material. The base in turn may be contained within an end of a case (such as a flashlight-style case, which may hold a batter power supply for the beam source), with the torus facing outward beyond the end of the case.

In the alternative case where the diffuser element comprises a pair of side-by-side cylinders of solid transparent refracting material with substantially parallel cylindrical axes, the light beam from the source would be directed toward a point of contact of the two cylinders with an incident orientation that is within 10° of perpendicular of the cylindrical axes. The beam has a width so as to be coupled into both cylinders and then be partially reflected and partially refracted therein at respective cylindrical surfaces such that light is projected from the diffuser as a widely distributed fan of light. In that case, the beam source and dual cylinder diffuser element may be mounted to a base that is adapted to rotate about an axis substantially coinciding with the incident beam, such that the distributed fan of light output from the diffuser element also rotates.

A visual dazzler system for temporarily disorienting subjects to light projected from the system, accordingly comprises a case containing and delivering electrical power to a light beam source and also containing a solid diffuser element of transparent refractive material optically coupled to receive a light beam from the beam source such that the received light beam is partially reflected and partially refracted multiple times within the diffuser element and thereby is projected radially outward from the diffuser over a wide distribution to any of one or more subjects in line of sight of the projected light. A flashlight-style case can have a mount for attachment of the dazzler to a firearm. Flashlight-style cases may also be generally be adapted for handheld operation, or alternatively for thrown operation (as in a stun grenade). In that latter embodiment, a weighted base is provided, with the beam source and diffuser attached to the base under a break-resistant transparent hemispherical cover. In a variant application, the dazzler's beam source can be adapted to have a visible or infrared output wavelength or range of wavelengths that corresponds to optical sensors of specified surveillance or weapons guidance systems, thereby extending its potential uses beyond human subjects.

DETAILED DESCRIPTION

Figure 1:
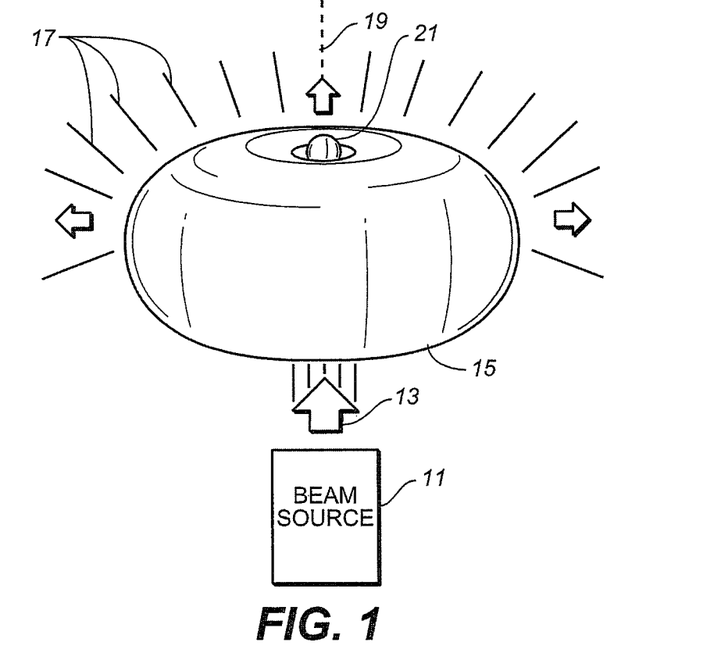
FIG. 1 is a schematic side view of the basic elements of a diffuse light source or visual dazzler system in accord with the present invention, using a torus diffuser as the depicted diffuser element.

With reference to FIG. 1, a diffuse light source is seen to have a light beam source 11, such as a laser or LED, emitting a light beam 13, and a diffuser element 15 in the form of a solid ring torus of transparent refracting material. Exemplary applications of such a diffuse light source include use as home or industrial light bulbs or as permanent light fixture sources without removable bulbs. Energy efficient light sources of this type may be configured with a single stationary "lens" functioning as a diffuser element to cause the light 17 to radiate outward from the source in a sphere of light at angles typically greater than 65° from the source beam's input light vector 19, giving a angular range exceeding 130°. It is possible that the light from the diffuser 15 could radiate over a full 360° sphere, although in many cases it would desirable avoid back illumination so that a range of 330° would be adequate. The beam source 11 may produce a full spectrum of visible light energy, such as when white LEDs are employed. While LEDs are best for most general lighting applications, high intensity light sources such as most lasers are applicable especially in the visual dazzler applications discussed more fully below. In some dazzler applications, a single wavelength output, perhaps targeted for specified light sensors, as in surveillance or weapons guidance systems, is best. In such cases, the wavelength may be anywhere from mid- and near-infrared through visible through ultraviolet, depending on the dazzler's target.

As seen in FIG. 1, the beam 13 is generally directed along the axis of rotation 19 used to define the toroid geometry of the diffuser 15. In particular, the diffuser element 15 can be in the form of a "donut-shaped" lens (ring toroid). The torus diffuser element or "lens" 15 is characterized by a surface of revolution generated from rotation of a closed plane curve (e.g., a circle) about an axis coplanar with, outside of, and proximate to the curve. The inner diameter of the resulting torus is very small (e.g., at most 250 µm) and generally much smaller than the beam width. Alternately, the diffuser could be in the form of a horn toroid (axis of rotation tangent to the closed plane curve) or a spindle torus (axis of rotation intersecting the closed plane curve). However, the manufacturing of the ring torus shape is easiest and least costly to implement. Locating a ball lens or bead 21 (or even a hemispherical lens) along the axis 19 just behind the central opening of the ring torus opposite from the beam source 11 would prevent a beam of intense light escaping through the hole in the toroid without being sufficiently dispersed.

The beam 13 itself can be diverging, collimated or highly focused. If desired, multiple sources with different wavelengths or ranges of wavelengths could be combined into a single beam 13 directed toward the diffuser 15. It is preferably displaced very slightly from the torus' defining axis of rotation by up to 15% of the beam width, and its incident direction can also oriented up to 10° away from the axis of the torus (which may create a wider angle of dispersion). Because the beam width is wider than any opening in the torus (albeit preferably not wider than half the torus' outer diameter), the incident light will be coupled into the torus, be partially reflected and refracted multiple times, and thereby be emitted 17 from the diffuser 15 over a wide distribution.

If desired, highly reflective or partially reflective coatings can be applied to the surface of the toroid to shape or otherwise modify the outward radiating of the dispersed light for particular applications. One example would include coating the backside surface of the toroid (that is on the same side as the beam source) to create a hemisphere of light. In another example, one could coat the surface of the toroid on both sides while leaving only a band of open lens around the outer circumferential ring of the diffuser to create a pancake of side-emitted light. Alternatively, instead of (or in addition to) coatings, a separate external reflector surface (whether flat, cone, or concave geometry) could be placed near the diffuser 15 at either the light input vector side or opposite side to tailor the light output. This external reflector could be moveable to allow for active control over light emission.

Figure 2:
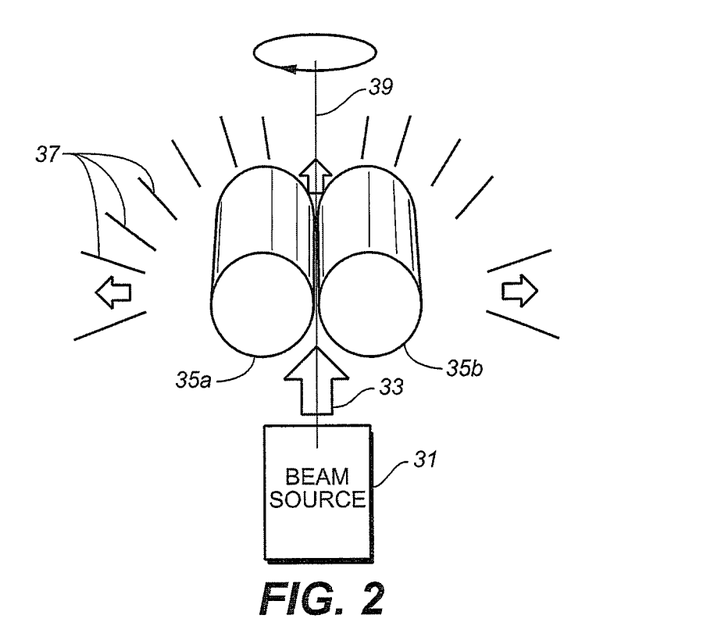
FIG. 2 is a schematic side view of an alternative embodiment of a diffuse light source or visual dazzler system in accord with the present invention, which uses dual side-by-side solid transparent cylinders as the diffuser element.

With reference to FIG. 2, in an alternative embodiment, instead of a torus, the diffuser element could be formed as a pair of rod lenses (i.e. dual side-by-side solid transparent cylinders) 35a and 35b. This would cause the light 37 to radiate outward in a fan shape of greater than 75° from the input vector 39 of the beam 33 from source 31. Again, the fan of light could extend a full 360° distribution. When rotated around the axis 39 of the light beam 33, it would create a sphere-like light field radiating out from the dual cylinder diffuser 35. If necessary, a smaller rod lens (or even hemisphere rod lens) could be located centrally behind the point of contact of the two main cylinders 35a and 35b opposite from the beam source 31 to prevent any beam of intense light escaping through a crack between the rod lenses without having first been sufficiently dispersed cylinder lenses themselves.

Figure 8:
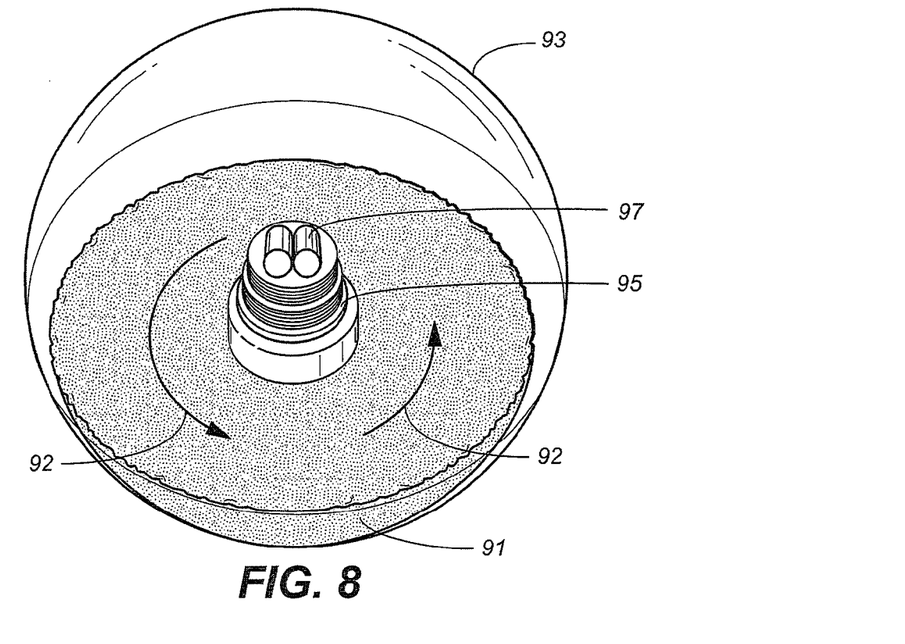
FIG. 8 is another embodiment of a visual dazzler system combining features of a thrown dazzler system as in FIG. 6 with a rotating side-by-side dual cylinder lens diffuser element as in FIG. 2.

FIG. 8 shows an embodiment implementing the FIG. 2 arrangement in a dazzler configured for thrown operation. The beam source 95 and a dual cylinder diffuser element 97 are mounted to a base 91, which are adapted to rotate, e.g. in a clockwise direction 92, about an axis substantially coinciding with the incident beam, such that the distributed fan of light output (corresponding to light 37 in FIG. 2) also rotates. (The FIG. 2 arrangement could likewise be implemented in a flashlight-case embodiment like that in FIG. 5.)

As with the toroidal diffusers, the dual cylinder diffusers can be provided with reflective coatings, applied to their respective surfaces to shape or otherwise modify the fan (or rotating fan) of the radiating light for particular applications. As before, examples could include coating the rear surface of the pair of rod lenses on the same side as the light source to create a hemisphere of light, or coating the surfaces on both sides while leaving only a band of open lens around the outer strips of the cylinders to create elongated ribbons of emitted light.

In yet another possible embodiment, the toroid lens diffuser could be defined by a double, triple, n-torus, wherein the diffuser is separately supplied with light at each point of folding of the torus (at each "donut hole"). The toroidal diffuser could also be a sectioned toroid, defined by a section at the widest point of the lens at the plane of rotation of the torus (to create a lens of the geometry of a single side of a sliced bagel).

Figure 3:
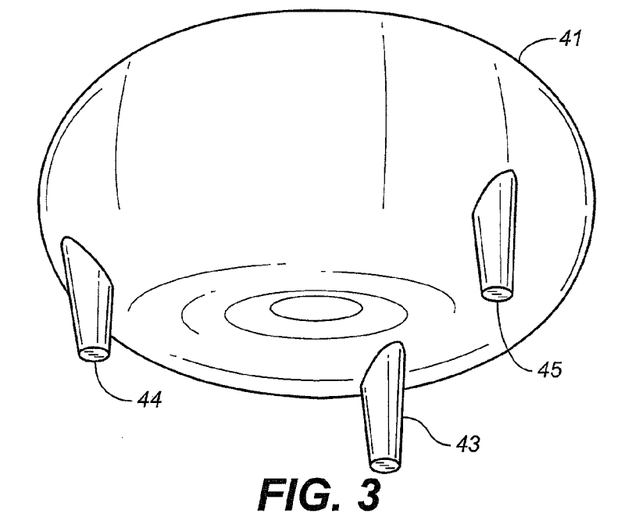
FIG. 3 is a perspective view of a torus diffuser for use in the embodiment of FIG. 1, which is provided with a set of legs projecting from the torus.
Figure 4A:
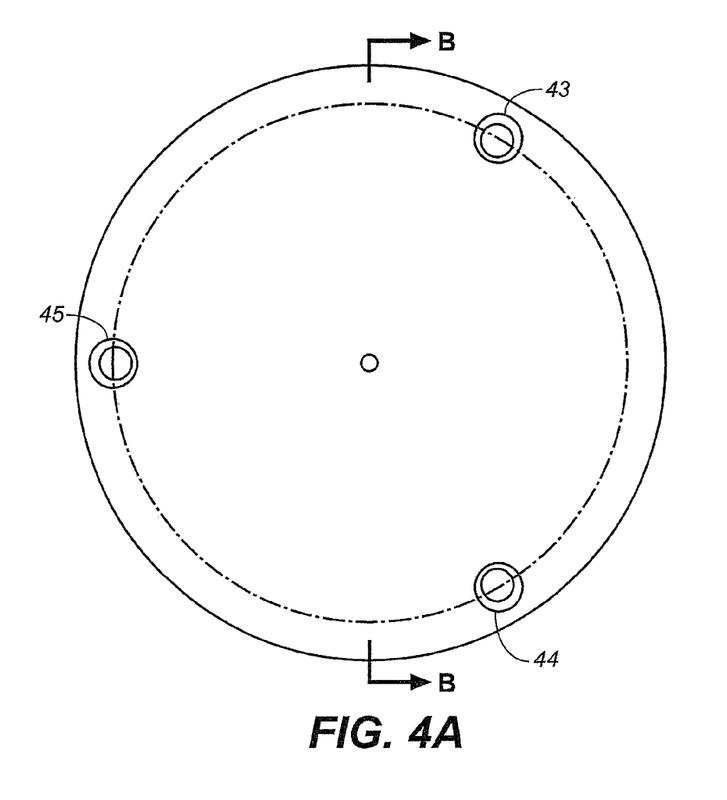
FIGS. 4A and 4B are respective rear and side view of the leggy torus diffuser of FIG. 3.
Figure 4B:
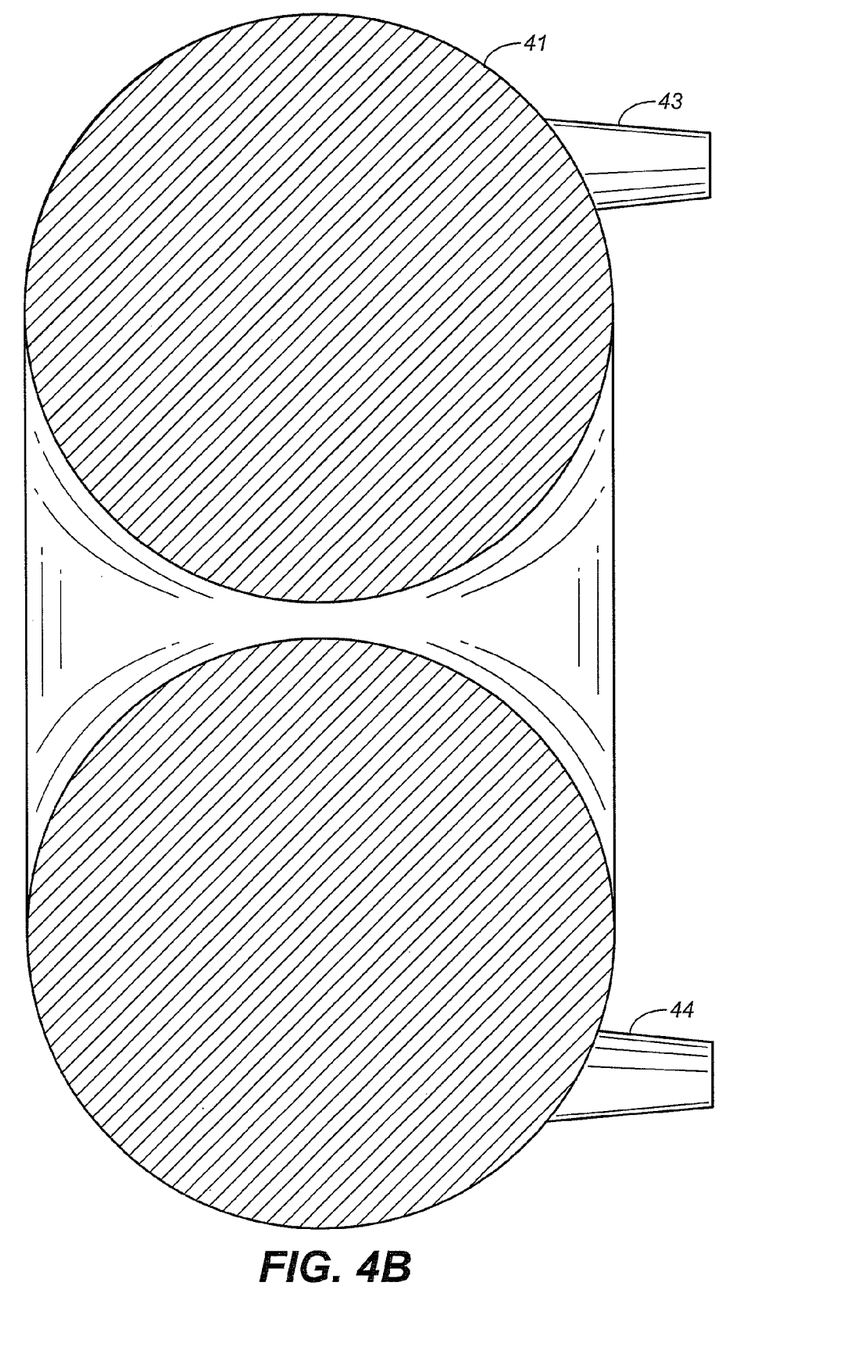

With reference to FIGS. 3, 4a and 4b, a representative working example of a ring toroidal diffuser 41 is shown. The torus is generated from a 0.180 inch (5.572 mm) diameter circle that is 0.005 inch (0.127 mm) from the axis of rotation. This leaves a central hole of 0.010 inch (0.254 mm). In this embodiment a set of three legs 43-45 are provided for mounting the torus diffuser to a base. The legs can also provide heat sinking to the base. The legs project rearward (the beam source side) and are located on the outer portion of the torus, in this case 0.125 inch (3.175 mm) from the axis of rotation and are 0.020 inch (0.508 mm) in diameter, with a 5° typical draft angle. The leggy torus 41 may be constructed from any transparent refracting material, such as thermoplastic (nylon, acrylic, etc.) or optical glass, and may be formed by pouring the heated liquid or viscous material into a preformed mold.

The torus 41 with legs 43-45 are designed for mounting, along with the beam source, firmly to a base so that beam source and diffuser are maintained in fixed relation to each other. The entire base/source/diffuser assembly may be contained in the forward end of a case. In the case of a dual cylinder type of diffuser, the base may be a motor-driven turntable for providing axial rotation of the assembly.

The legs 43-45, in addition to fixing the torus relative to the beam source, can serve as heat sinks, as needed, to the base. Additionally, the legs tend to act as light pipes for some of the internal light coupled into the torus from the beam source. As such, sensors can mounted beneath one or more of the legs for monitoring light levels. The monitored light can be feedback for safety purposes where the relation of light output from the torus to the monitored light level from the legs is determined experimentally. The monitored light, if obtained from all three legs, can be used for initial alignment of the beam source to the torus diffuser to ensure adequate and uniform coupling of the beam into the torus.

Figure 5:
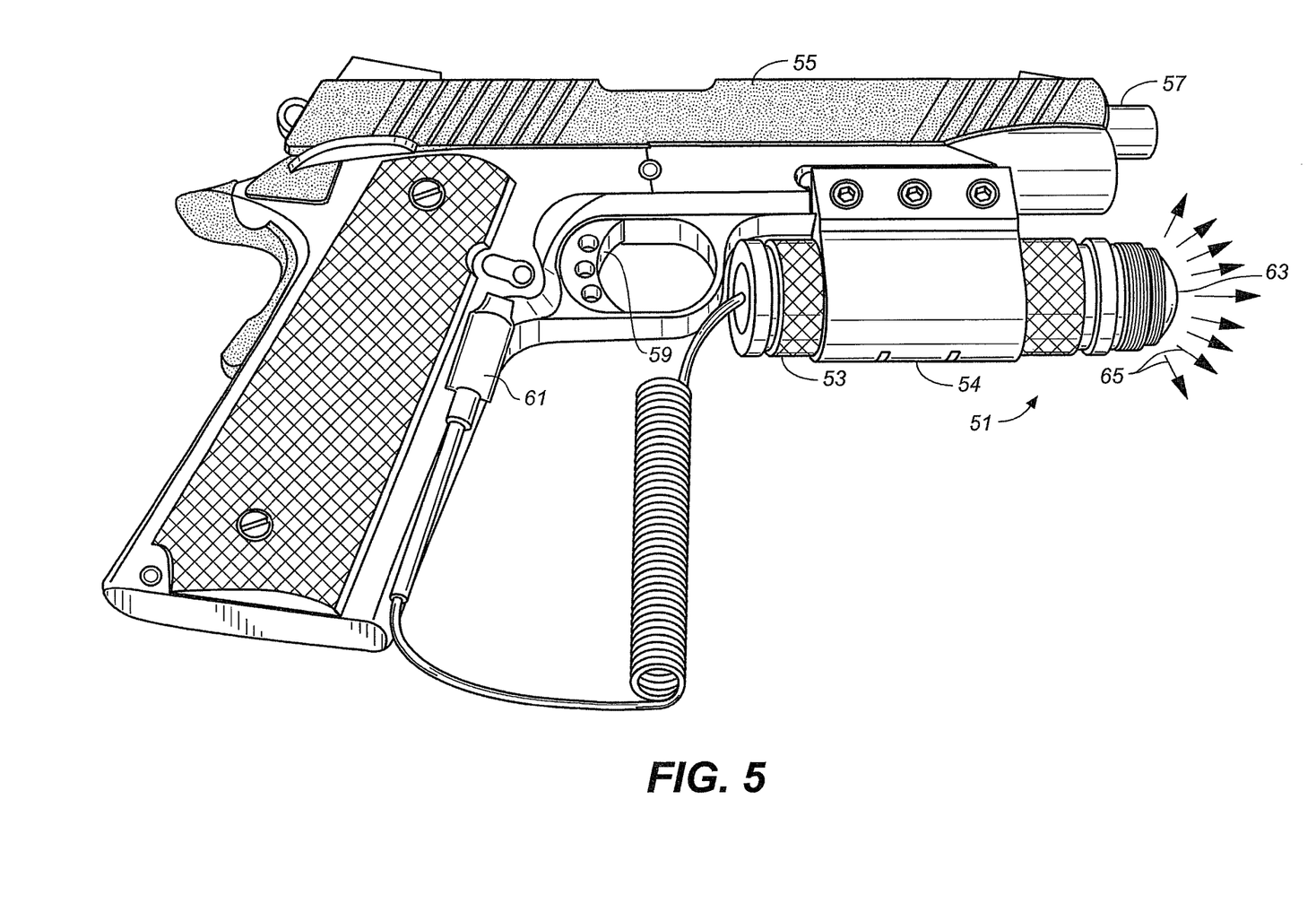
FIG. 5 is a side view of a firearm having visual dazzler system in accord with the present invention mounted thereto in a flashlight-style case.
Figure 6:
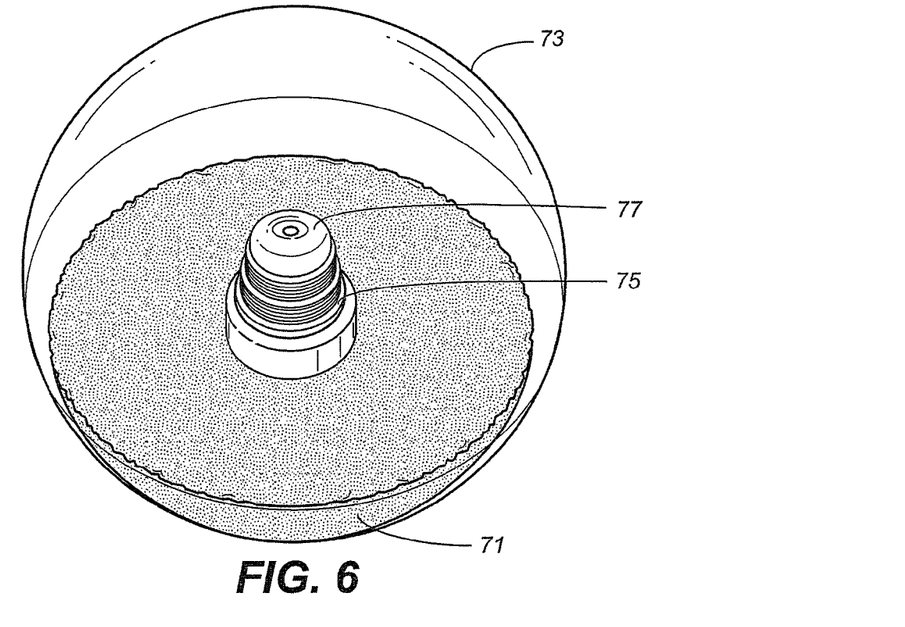
FIG. 6 is an alternative embodiment of a visual dazzler system in accord with the present invention, which is adapted for throwing.

With reference to FIGS. 5 and 6, examples of the invention for use as visual disorientation or disruption systems are shown. These are preferentially designed for use with laser light sources. In particular, FIG. 5 shows a visual dazzler system 51 that is contained within a tactical flashlight-style case 53 and mounted to a firearm 55, in this case beneath the barrel 57 of the firearm 55, just forward of the trigger 59. The flashlight case 53 may contain a battery power supply for the beam source, and an external switch 61 is seen for turning the dazzler system on and off as needed. The beam source (not visible) and diffuser element 63 are located in the forward portion of the case, with the diffuser 63 jutting out slightly from the end of the case 53, so that the light 65 may radiate outward over a wide distribution, possibly exceeding 180° (that is, a full hemisphere). A similar hand-held flashlight unit could also be constructed. The individual employing it could hold it above their head and create a sphere of laser light radiating outward from their body that would be nearly impossible for an assailant to look at without experiencing visual disruption and disorientation.

While the dazzler' brightness is not such as to cause permanent blindness, when using laser (or LED) of particular wavelengths, safety glasses with selective filtration are used by those employing the dazzler to avoid being dazzled themselves, especially but not exclusively in the case where the light distribution 65 covers a range of angles near or exceeding 180° which might also incidentally fall upon team members on the user's flank and thereby potentially affect operational effectiveness.

In FIG. 6, the dazzler system is configured for thrown operation, as a kind of stun grenade like implement. The base 71 is weighted with a hemispherical break-resistant transparent cover 73, so that it ends up facing base-side down/cover-side up. The mounted beam source 75 and diffuser 77 are centrally located under the cover. In this example, the round case could be thrown into a room of hostile individuals or assailants to disorient or disrupt their vision before law enforcement or military personnel enter the room to subdue them. Similar examples to those described above could be employed with non-laser light-sources of high intensity.

The system of creating a sphere of visual disorientation or disruption about the user as a hand-held defense system or about the light source itself as a round, transparent ball which could be thrown into a hostile environment have a wide range of applications in the personal defense and military realm. For example, a more powerful version of the hand-held system could be employed at the top of the mast of a ship to make it essentially impossible for visual targeting by assailant individuals or optically guided weapons. Examples of the invention such as this have application in a wide range of conflict or defense scenarios including personal defense, military de-escalation, and visual targeting and guidance disruption. Given the flexibility of examples of the invention, embodiments may be used in military environments as well as in general civilian defense. Further, the invention is not limited to use as a visual disorientation or disruption system for defense only, and can be used as a signaling beacon to aid in search efforts for lost individuals or vehicles.

In order to characterize the expected light distribution, we can consider the case of a torus diffuser in which the planar closed loop defining the torus cross-section is a circle of radius R and in which the axis of rotation is a distance a/2 from the circle to produce a torus with a central hole diameter (inner diameter) a. Because of radial symmetry, the simplest case can assume perfect axial incidence, reducing the calculation to two dimensions. For a laser (coherent light) beam source with a wavelength $\lambda$ and beam width D, any light not coupled into the torus but passing straight through the torus central hole (if we ignore the preferred case of a bead placed over the hole) reduces to the case of a single slit configuration. This provides the first component contributing to the light field at a distance L from the plane of the diffuser, wherein by diffraction:

$$E1 = e \cdot a \cdot [\sin u]/u \cdot \sin \{2\pi \cdot [t/T - [y^2 + L^2]^{1/2}/\lambda\}, \text{ where}$$

$u = \pi \cdot a \cdot \sin [y/L]/\lambda$, and
$T = \lambda/c$ (c being the speed of light in air).

The contributions E2 and E3 to the resultant light field from light coupled into respective left and right sides of the torus are mirror images of one another. The simplest calculation assumes just a first refraction where each portion of the beam is incident upon the input side of the torus followed by a second refraction where the first refracted light along a path E2' or E3' exits the torus (i.e., ignoring any internal reflections and subsequent refractions). As this would be the bright contribution, the estimates obtained using that assumption of just two refractions would be close to the correct overall field. The refraction angles of the various parts of the beam depend upon the relative refractive index $n_2/n_1$, where $n_2$ is the refractive index of the torus material and $n_1$ is the refractive index of air. They also depend upon the distance of that part of the incident beam E (with polarization components s and p) from the circular center of the torus and thus upon the angle of incidence $\theta$.

$$(E2_s', E2_p') = (2 \cdot \sin I_2 \cdot \cos I_1 \cdot E_s/\sin [I_1 + I_2], \tan [I_1 - I_2] \cdot E_p/\tan [I_1 + I_2]),$$

$$I_1 = \pi/2 - \theta, I_2 = \arcsin(n_1 \cdot [\sin I_1]/n_2)$$

$$(E2_s, E2_p) = (2 \cdot \sin I_2' \cdot \cos I_1' \cdot E_s/\sin [I_1' + I_2'], \tan [I_1' - I_2'] \cdot E_p/\tan [I_1' + I_2']),$$

$$I_1' = I_1(\theta), I_2' = I_2(\theta)$$

The contributions E4 and E5 to the light field assume reflection of incident light E on the inside surface of respective left and right portions of the torus, followed by passage of the reflected light through the hole in the torus. Again these are mirror images of each other. The reflection angles of the various inner parts of the beam hitting an edge of the torus are dependent upon the distance of that part of the beam from the circular center of the torus and thus upon the angle of incidence $\theta$. The reflection coefficient $\gamma(\theta)$ depends also on the light polarization, s or p.

$$(\gamma_s(\theta), \gamma_p(\theta)) = (2 \sin I_1 \cdot \sin I_2/\sin(I_1 + I_2), [n_2 \cos I_2 - n_1 \cos I_1]/[n_2 \cos I_2 + n_1 \cos I_1])$$

$$(E4_s, E4_p) = (\gamma_s(\theta) \cdot E_s, \gamma_p(\theta) \cdot E_p)$$

The total field is the contribution from all sources: E1+E2+E3+E4+E5.

Figure 7:
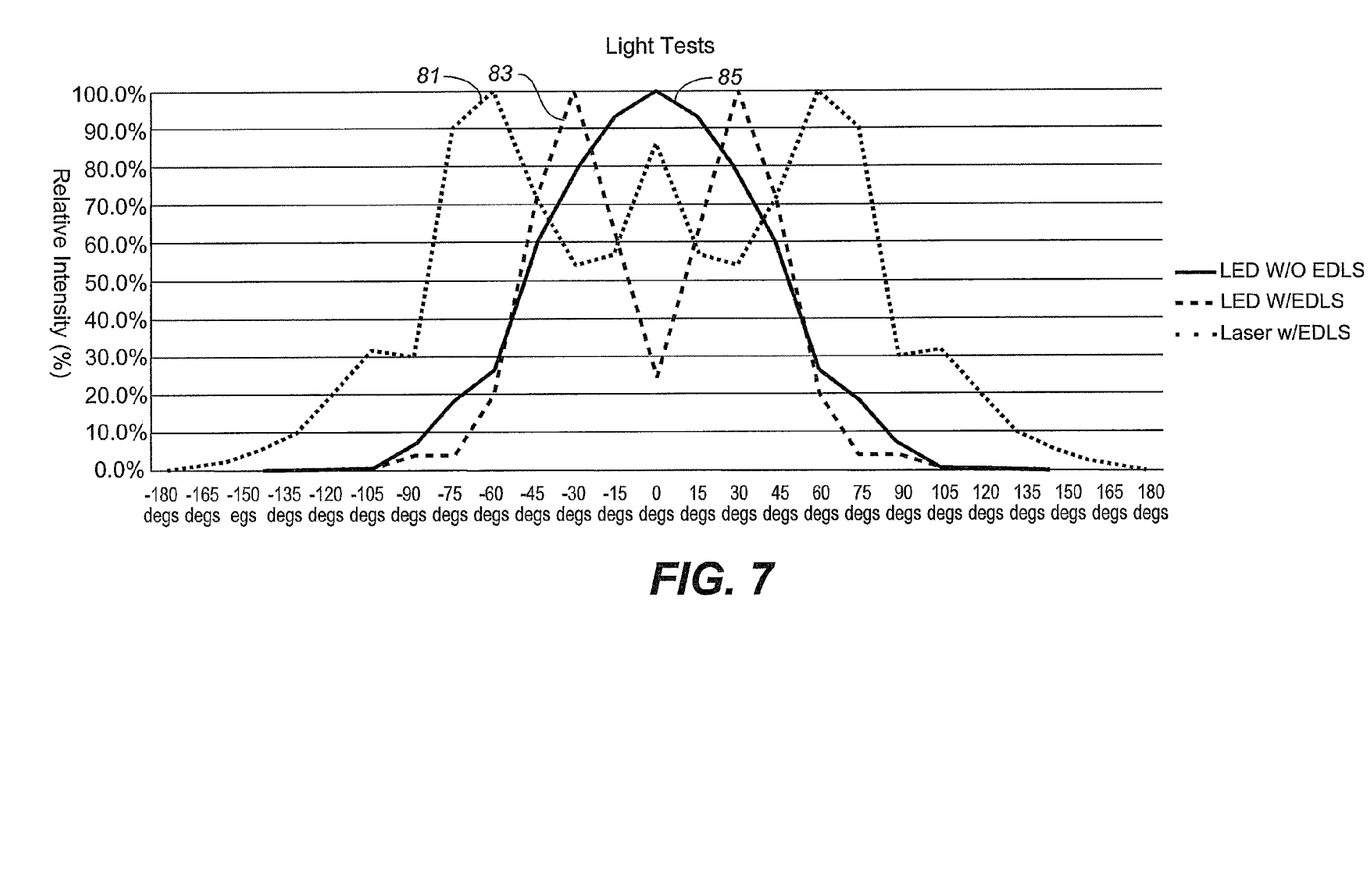
FIG. 7 is a graph of relative intensity versus azimuth angle of the light output from various embodiments of the diffuse light source or visual dazzler system of FIG. 1.

As seen in FIG. 7, some representative distributions of output light, as measured output from a test torus as in FIG. 3 are seen. The distribution 81 comes from using a laser source having the energy dispersive lens system (torus diffuser) as in the present invention. The distribution 83 comes from the same configuration, but using a light emitting diode (LED) as the beam source. As a comparison, the narrowest distribution 85 comes from the same LED source but without the torus diffuser in place.

The invention claimed is:

1. A visual dazzler system for temporarily disorienting subjects to light projected from the system, comprising a case containing and delivering electrical power to a light beam source and also containing a solid diffuser element of transparent refractive material optically coupled to receive a light beam from the beam source at tangential or near tangential incidence such that the received light beam is partially reflected and partially refracted multiple times within the diffuser element and thereby is projected radially outward from the diffuser over a wide distribution to any of one or more subjects in line of sight of the projected light;
wherein the diffuser element comprises a ring torus of solid transparent refracting material, the torus characterized by a surface of revolution generated from rotation of a closed plane curve about an axis coplanar with, outside of, and proximate to the curve, the light beam source positioned relative to the torus such that a light beam from the source is directed substantially along the axis of the torus, the beam having a width so as to be coupled into the torus and partially reflected and partially refracted therein at the torus surface, the torus having a reflective coating on a rear source-side surface located be and the extent of the incident beam such that light emitted from the torus diffuser is tailored to have a specified distribution pattern.

2. The visual dazzler system as in claim 1, wherein the case is a flashlight-style case.

3. The visual dazzler system as in claim 2, wherein the flashlight-style case has a mount for attachment to a firearm.

4. The visual dazzler system as in claim 2, wherein the flashlight-style case is generally cylindrical in shape so as to be adapted for handheld operation.

5. The visual dazzler system as in claim 1, wherein the case is adapted for thrown operation with a weighted base and a break-resistant transparent hemispherical cover attached to the base, with the beam source and diffuser attached to the base under the cover.

6. The visual dazzler system as in claim 1, wherein the case further holds a battery power supply for the light beam source.

7. The visual dazzler system as in claim 1, wherein the light beam source is a laser.

8. The visual dazzler system as in claim 1, wherein the light beam source is at least one light emitting diode (LED).

9. The visual dazzler system as in claim 1, wherein the light beam source provides continuous light output.

10. The visual dazzler system as in claim 1, wherein the light beam source provides pulsed light output.

11. The visual dazzler system as in claim 1, wherein the light beam source has a visible or infrared output wavelength or range of wavelengths corresponding to optical sensors of specified surveillance or weapons guidance systems.

12. The visual dazzler system as in claim 1, wherein the diffuser element projects light radially outward over a distribution angle of at least 75°.

13. A visual dazzler system for temporarily disorienting subjects to light projected from the system, comprising a case containing and delivering electrical power to a light beam source and also containing a solid diffuser element of transparent refractive material optically coupled to receive a light beam from the beam source such that the received light beam is partially reflected and partially refracted multiple times within the diffuser element and thereby is projected radially outward from the diffuser over a wide distribution to any of one or more subjects in line of sight of the projected light, the solid diffuser element characterized by a section in a plane containing the light beam that is defined by a pair of side-by-side separated closed plane curves;

wherein the diffuser element comprises a pair of side-by-side cylinders of solid transparent refracting material with substantially parallel cylindrical axes, the light beam from the source being directed toward a point of contact of the two cylinders with an incident orientation that is within 10° of perpendicular of the cylindrical axes, the beam having a width so as to be coupled into both cylinders and partially reflected and partially refracted therein at respective cylindrical surfaces such that light is projected from the diffuser as a widely distributed fan of light, and wherein the beam source and dual cylinder diffuser element are mounted to a base adapted to rotate about an axis substantially coinciding with the incident beam, such that the distributed fan of light output from the diffuser element also rotates.

* * * * *